UNITED STATES PATENT OFFICE

2,317,056

METHOD FOR REMOVING ACIDIC CONSTITUENTS FROM ORGANIC LIQUIDS

Lawrence M. Henderson, Winnetka, and Donald C. Bond, Northbrook, Ill., assignors to The Pure Oil Company, Chicago, Ill., a corporation of Ohio No Drawing. Application September 2, 1941, Serial No. 409,272

10 Claims. (Cl. 196—30)

This invention relates to a method for removing weakly acidic substances from otherwise neutral water-immiscible liquids and to a reagent useful in connection therewith. More particularly, the invention involves a method and reagent for removing mercaptans from hydrocarbon liquids.

It is known that the ability of alkaline solutions to remove weakly acidic substances such as mercaptans from hydrocarbon liquids such as gasoline can be materially enhanced by adding to the alkaline solution low boiling fatty acids, naphthenic acids and alkyl phenols or the alkali metal salts thereof.

It has now been discovered that the efficiency of alkali solutions in removing weakly acidic substances such as mercaptans from water-immiscible liquids such as hydrocarbon oil can be increased by adding yacca gum to the alkali solutions. Yacca gum, as defined by Hackh's Chemical Dictionary is "acaroid resin" which, in turn, is defined as "earth shellac, yellow resin, grass tree gum, Botany Bay gum, accroides gum, yacca gum. The exudation of the stems of *Xanthorrhaea hastilis*, a Liliacea of Australia." Yacca gum is also referred to in the literature by various names including black bay gum and Xanthorrhaea resin. The composition of this material varies considerably depending upon the particular source. Samples of yacca gum have been reported in the literature to contain peonal, hydroxy peonal, l-citronellol as well as p-coumaric acid and esters thereof. For purpose of this invention any of the various ordinary commercial grades of yacca gum may be used.

In preparing reagents in accordance with our invention, an aqueous alkali metal hydroxide solution preferably sodium or potassium hydroxide is prepared and yacca gum either dissolved directly in the alkali metal hydroxide solution or the yacca gum first reacted with alkali and the reaction product dissolved in aqueous alkali solution. Although the alkali metal hydroxide and yacca gum content of the treating solution vary within wide limits, the treating solution in order to efficiently remove mercaptans or other weakly acidic material from liquids in which they are present should preferably contain at least 5% by weight of free alkali metal hydroxide and not less than 5% by weight of yacca gum. Free alkali metal hydroxide is intended to define the amount of alkali metal hydroxide in excess of that required for reaction with yacca gum to form the sodium salt thereof. The upper limit of alkali metal hydroxide employed in the treating solutions is ordinarily about 30% by weight. Higher concentrations may be used but such solutions are rather viscous and give rise to emulsion troubles when violently contacted with the liquid to be treated. The upper limit of yacca gum content is determined by the solubility of the yacca gum in the aqueous alkali metal hydroxide solution and is preferably maintained below about 30% in order to avoid the production of viscous solutions with the attendant emulsion difficulties hereinbefore mentioned. The amount of yacca gum which will dissolve in aqueous alkali metal hydroxide solutions varies with the alkali concentration of alkali metal hydroxide and with the specific alkali metal hydroxide employed.

In treating a hydrocarbon oil or other weak acid-containing-water-immiscible liquid with the treating reagent, the two are contacted with each other either in a batch operation or in a conventional continuous countercurrent operation at atmospheric temperatures and preferably in the absence of air in order to eliminate the possibility of oxidation of mercaptans to oil-soluble disulfides. Where batch operation is used, the ratio of treating solution to liquid being treated may vary within wide limits. We have found that approximately 5% to 10% by volume of treating solution based on the oil gives satisfactory results. The treatment may be repeated with new batches of treating solution as often as is necessary to remove the required amount of acidic material. When treating in continuous countercurrent method, the time of contact between treating reagent and liquid being treated and the ratio of treating reagent to oil treated may be regulated by the length of the treating column or the number of treating columns connected in series.

When hydrocarbon distillates are treated to remove mercaptans, the treating reagent extracts mercaptans from distillates containing the same in the form of alkali metal mercaptides. The used treating agent can be readily regenerated by boiling the solution or by heating to the boiling point and passing superheated steam through the solution, in order to hydrolyze the mercaptides and volatilize the resulting mercaptans. The regenerated solution may be reused preferably after adjusting, if necessary, the alkali metal hydroxide and/or water content of the solution so that they are approximately the same as the fresh treating solution.

The following examples will serve to demonstrate the efficacy of aqueous alkali metal hydroxide-yacca gum solutions in removing mercaptans from cracked gasoline.

*Example 1.*—Cracked gasoline prepared by cracking petroleum oil under high pressures and temperatures and which gasoline contained 0.022% by weight of mercaptan sulfur was treated with 7% by volume of an aqueous sodium hydroxide solution containing 15% by weight of sodium hydroxide. The gasoline and treating solution were shaken for a period of five minutes in an atmosphere of nitrogen and then separated. The treated gasoline was found to contain 0.012% of mercaptan-sulfur which is a reduction of 45% in the mercaptan-sulfur originally present in the gasoline.

*Example 2.*—Another sample of the same gasoline as was treated in Example 1, was treated in the same manner and with the same amount of treating solution, prepared by dissolving sodium hydroxide and yacca gum in water in amounts such that the sodium hydroxide constituted 15% by weight and the yacca gum 10% by weight. This produced a solution containing 14.4% by weight of free sodium hydroxide. The yacca gum used in preparing the solution was red in color and had an acid number of 68. The sample of gasoline which was treated with this reagent was found to contain 0.01% by weight of mercaptan-sulfur after treatment which is a reduction of 55% in the amount of mercaptan-sulfur originally present in the gasoline.

*Example 3.*—A sample of similar gasoline containing 0.025% by weight of mercaptan-sulfur was treated in the same manner as in the preceding examples with a reagent prepared by dissolving 30% by weight of sodium hydroxide in water. The treated gasoline had a mercaptan-sulfur content of 0.0116, which is a reduction of 44% in the amount of mercaptan-sulfur present in the original gasoline.

*Example 4.*—A sample of gasoline, the same as that employed in Example 3, was treated in the same manner as in the preceding examples with a reagent prepared by dissolving sodium hydroxide and yacca gum in water in such amounts that the sodium hydroxide constituted 30% by weight and the yacca gum 20% by weight. This produced a solution containing 28.8% by weight of free sodium hydroxide. The yacca gum which was used was the same as that employed in Example 2. The treating reagent, as prepared, was at slightly elevated temperature in order to facilitate a solution of sodium hydroxide and yacca gum. Upon cooling a small amount of precipitate formed, the clear supernatant liquor was employed for treating the gasoline. The treated gasoline had a mercaptan-sulfur content of 0.0083 which is a reduction of 60% in the mercaptan-sulfur originally present in the gasoline.

While in the foregoing examples yacca gum was added to aqueous solutions of sodium hydroxide with the result that a portion of the sodium hydroxide reacted with the yacca gum, the solutions could equally well have been prepared by first reacting sodium hydroxide with yacca gum and the reaction product added to the aqueous sodium hydroxide solutions, thereby avoiding the reduction in free sodium hydroxide content of the solutions noted in the examples. It is also possible, of course, to adjust the sodium hydroxide content of the completed solution to produce an amount of free sodium hydroxide the same as that in the solutions where straight aqueous sodium hydroxide was employed as a treating reagent. In the latter case the increase in mercaptan-sulfur reduction produced by the yacca gum reagents, as compared to that produced by the straight sodium hydroxide solutions, would be even greater than that shown in the foregoing examples.

What is claimed is:

1. The method of removing weakly acidic substances from an organic liquid which comprises contacting said liquid with an aqueous solution containing alkali metal hydroxide and the reaction product of alkali and yacca gum.

2. The method of removing mercaptans from hydrocarbon distillate which comprises contacting said distillate with an aqueous solution containing alkali metal hydroxide and the reaction product of alkali and yacca gum.

3. Method in accordance with claim 1 in which the solution contains at least 5% by weight of free alkali metal hydroxide and at least 5% by weight of yacca gum in the form of its reaction product with alkali metal hydroxide.

4. Method in accordance with claim 2 in which the solution contains at least 5% by weight of free alkali metal hydroxide and at least 5% by weight of yacca gum in the form of its reaction product with alkali metal hydroxide.

5. Method in accordance with claim 1 in which the solution contains approximately 5–30% by weight of free alkali metal hydroxide and an amount of yacca gum in the form of its reaction product with alkali metal hydroxide not substantially less than 5% by weight nor more than that amount which is soluble in the solutions.

6. Method in accordance with claim 2 in which the solution contains approximately 5–30% by weight of free alkali metal hydroxide and an amount of yacca gum in the form of its reaction product with alkali metal hydroxide not substantially less than 5% by weight nor more than that amount which is soluble in the solution.

7. Method in accordance with claim 2 in which the distillate is contacted with approximately 5 to 10 per cent by volume of the aqueous solution.

8. Method in accordance with claim 1 in which the aqueous solution is regenerated after contact with the organic liquid by heating to the boiling point for a period of time sufficient to hydrolyze the mercaptides and to volatilize the liberated mercaptans.

9. Method in accordance with claim 2 in which the aqueous solution is regenerated after contact with the organic liquid by heating to the boiling point for a period of time sufficient to hydrolyze the mercaptides and to volatilize the liberated mercaptans.

10. The method of removing mercaptans from hydrocarbon oil which comprises counter-currently contacting said oil with from approximately 5–10 per cent by volume of an aqueous solution containing from approximately 5–30 per cent by weight of alkali metal hydroxide and yacca gum in an amount above 5 per cent by weight but not in excess of this amount which is soluble in the aqueous solution, said yacca gum being present in the form of its reaction product with alkali metal hydroxide, and regenerating the aqueous solution after contact with said oil by boiling until substantially all mercaptans are liberated and volatilized.

LAWRENCE M. HENDERSON.
DONALD C. BOND.